(12) United States Patent
Gallion

(10) Patent No.: US 11,466,797 B2
(45) Date of Patent: Oct. 11, 2022

(54) PROTECTIVE BUNDLE ROUTING GROMMET FOR WIDE RANGE PANEL THICKNESS

(71) Applicant: HellermannTyton Corporation, Milwaukee, WI (US)

(72) Inventor: Justin Gallion, Milwaukee, WI (US)

(73) Assignee: HellermannTyton Corporation, Milwaukee, WI (US)

(*) Notice: Subject to any disclaimer, the term of this patent is extended or adjusted under 35 U.S.C. 154(b) by 366 days.

(21) Appl. No.: 16/560,048

(22) Filed: Sep. 4, 2019

(65) Prior Publication Data
US 2019/0390799 A1    Dec. 26, 2019

Related U.S. Application Data

(62) Division of application No. 15/817,406, filed on Nov. 20, 2017, now Pat. No. 10,969,037.

(60) Provisional application No. 62/431,670, filed on Dec. 8, 2016.

(51) Int. Cl.
    *F16L 5/00*    (2006.01)
    *B60R 16/02*   (2006.01)
    *H02G 3/22*    (2006.01)
    *F16L 3/137*   (2006.01)

(52) U.S. Cl.
    CPC ............ *F16L 5/00* (2013.01); *B60R 16/0222* (2013.01); *F16L 3/137* (2013.01); *H02G 3/22* (2013.01)

(58) Field of Classification Search
    CPC ........ F16L 5/00; F16L 3/137; B60R 16/0222; H02G 3/22

USPC ............... 248/56, 62, 63, 65, 74.3, 74.1, 73; 16/2.1, 2.2
See application file for complete search history.

(56) References Cited

U.S. PATENT DOCUMENTS

| | | |
|---|---|---|
| 2,367,836 A | 1/1945 | Brown |
| 2,807,850 A | 10/1957 | Davidson |
| 2,816,951 A | 12/1957 | Sperry |

(Continued)

FOREIGN PATENT DOCUMENTS

| | | |
|---|---|---|
| CN | 102765547 A | 11/2012 |
| EP | 0756365 A1 | 1/1997 |

(Continued)

OTHER PUBLICATIONS

"Corrected Notice of Allowance", U.S. Appl. No. 15/817,406, dated Jan. 26, 2021, 2 pages.

(Continued)

*Primary Examiner* — Nkeisha Smith
(74) *Attorney, Agent, or Firm* — Colby Nipper PLLC

(57) ABSTRACT

A grommet assembly configured to be disposed within an aperture in a panel having a first surface and a second surface opposite the first surface is presented herein. The grommet assembly includes a grommet frame configured to contact the first surface of the panel and an elastomeric region extending from the grommet frame and configured to be inserted within the aperture. The elastomeric region defines a plurality of ribs angled such that the ribs are configured to provide an insertion force when the elastomeric region is inserted within the aperture and provide a removal force greater than the insertion force when the elastomeric region is withdrawn from the aperture. A method of manufacturing the grommet assembly is also presented.

20 Claims, 10 Drawing Sheets

(56) References Cited

U.S. PATENT DOCUMENTS

| | | | |
|---|---|---|---|
| 4,289,288 A | 9/1981 | Gransberry et al. | |
| 4,640,479 A | 2/1987 | Shely et al. | |
| 4,656,689 A | 4/1987 | Dennis | |
| 5,069,586 A | 12/1991 | Casey | |
| 5,337,983 A | 8/1994 | Mailey | |
| 5,421,541 A * | 6/1995 | Condon | F16L 5/00 |
| | | | 248/56 |
| 5,537,714 A | 7/1996 | Lynch et al. | |
| 5,632,457 A | 5/1997 | Neely | |
| 5,653,409 A | 8/1997 | White et al. | |
| 5,669,731 A * | 9/1997 | Hironaka | F16L 3/137 |
| | | | 403/392 |
| 5,739,468 A * | 4/1998 | Rossman | F16L 5/02 |
| | | | 174/669 |
| 5,847,318 A | 12/1998 | Chapman | |
| 5,950,277 A | 9/1999 | Tallmadge et al. | |
| 6,119,305 A | 9/2000 | Loveall et al. | |
| 6,359,224 B1 * | 3/2002 | Beele | H02G 3/22 |
| | | | 174/665 |
| 6,660,937 B1 * | 12/2003 | MacLeod | H02G 3/22 |
| | | | 174/152 G |
| 6,768,058 B2 | 7/2004 | Pallapothu | |
| 7,322,548 B2 | 1/2008 | Mielke et al. | |
| 7,726,552 B2 | 6/2010 | Chadima | |
| 7,735,876 B2 * | 6/2010 | Chiu | F16L 5/00 |
| | | | 403/240 |
| 7,790,989 B2 * | 9/2010 | Delakowitz | F16L 5/10 |
| | | | 174/31 R |
| 7,915,534 B2 * | 3/2011 | Uchibori | B60R 16/0222 |
| | | | 174/152 G |
| 8,141,825 B2 | 3/2012 | Logan et al. | |
| 8,357,854 B2 * | 1/2013 | Thompson | B29C 45/44 |
| | | | 174/93 |
| 8,393,134 B2 | 3/2013 | Morgante | |
| 8,497,435 B2 * | 7/2013 | Nagata | H02G 15/013 |
| | | | 174/152 G |
| 8,500,072 B2 | 8/2013 | Ayme et al. | |
| 8,839,486 B2 * | 9/2014 | Diehl | B21J 15/025 |
| | | | 411/501 |
| 9,209,613 B2 | 12/2015 | Piuzzi et al. | |
| 9,425,597 B2 * | 8/2016 | Suzuki | B60R 16/0222 |
| 9,470,342 B2 * | 10/2016 | Rumsey | F16L 5/00 |
| 9,731,595 B2 * | 8/2017 | Wolf | B60K 15/04 |
| 9,806,510 B2 | 10/2017 | Trapassi et al. | |
| 9,894,963 B2 | 2/2018 | Choi | |
| 9,920,859 B2 * | 3/2018 | Perrigo | B64D 37/005 |
| 10,969,037 B2 | 4/2021 | Vaughn et al. | |
| 2008/0185061 A1 * | 8/2008 | Fisk | B60H 1/3233 |
| | | | 137/846 |
| 2011/0309611 A1 * | 12/2011 | Smith | H02G 3/065 |
| | | | 285/139.3 |
| 2012/0243294 A1 | 9/2012 | Kaneko et al. | |
| 2012/0292461 A1 | 11/2012 | Piuzzi et al. | |
| 2016/0348810 A1 * | 12/2016 | Kipp | E04G 15/061 |
| 2018/0163900 A1 | 6/2018 | Vaughn | |

FOREIGN PATENT DOCUMENTS

| | | |
|---|---|---|
| FR | 2952418 A1 | 5/2011 |
| GB | 2451426 A | 2/2009 |

OTHER PUBLICATIONS

"Notice of Alowance", U.S. Appl. No. 15/817,406, dated Dec. 24, 2020, 7 pages.

"Extended European Search Report", EP Application No. 17204420.8, dated May 3, 2018, 8 pages.

"Foreign Office Action", EP Application No. 17204420.8, dated Jul. 19, 2019, 7 pages.

"Non-Final Office Action", U.S. Appl. No. 15/817,406, dated Apr. 29, 2020, 8 pages.

"Non-Final Office Action", U.S. Appl. No. 15/817,406, dated Nov. 12, 2019, 8 pages.

"Final Office Action", U.S. Appl. No. 15/817,406, dated Sep. 8, 2020, 6 Pages.

"Non-Final Office Action", U.S. Appl. No. 15/817,406, dated Oct. 23, 2020, 9 pages.

* cited by examiner

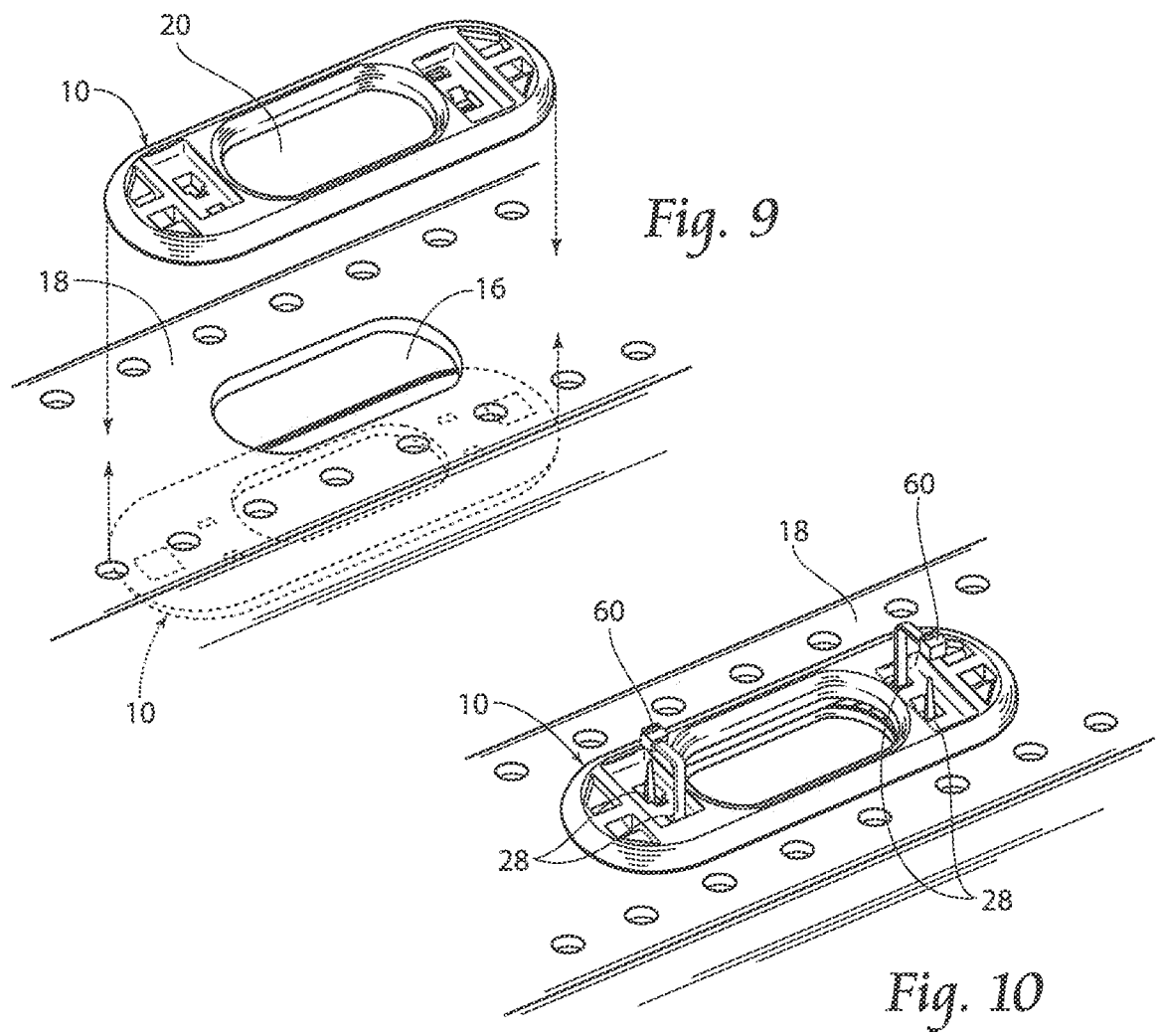
Fig. 9
Fig. 10
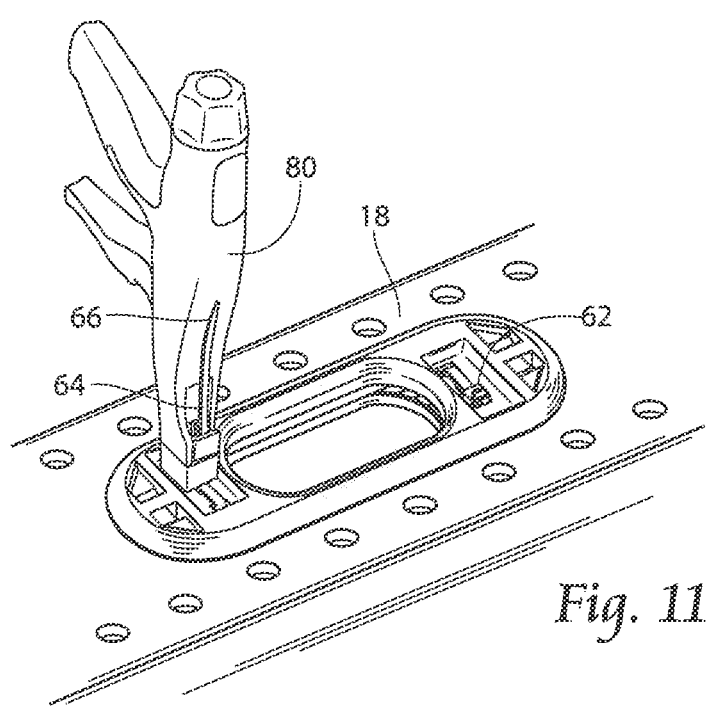
Fig. 11

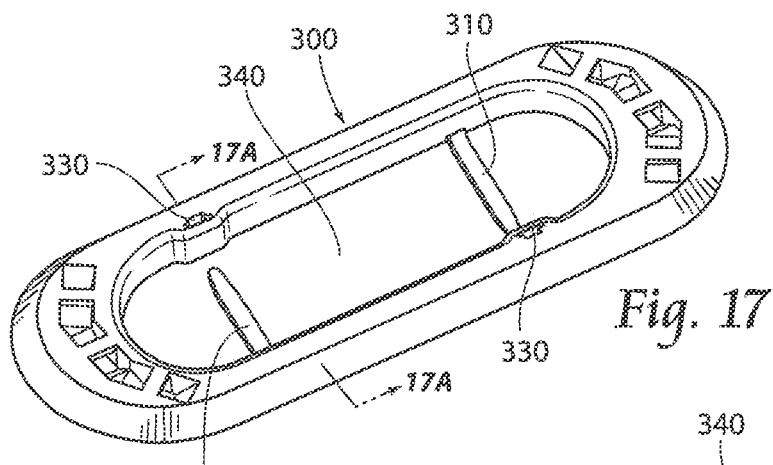
Fig. 17
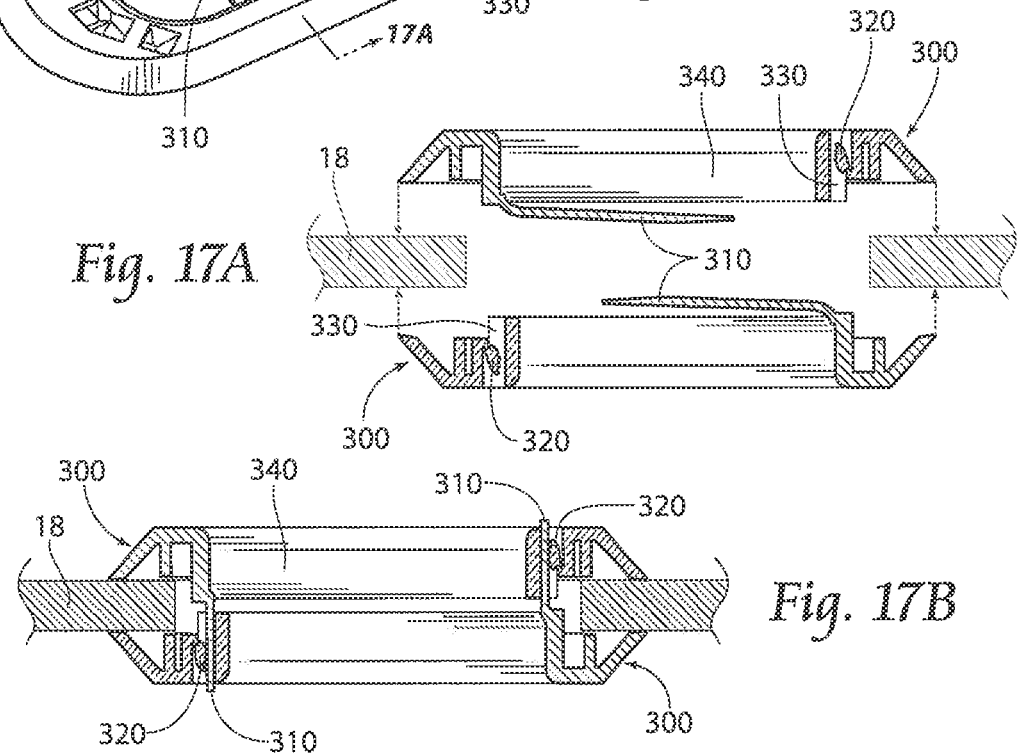
Fig. 17A
Fig. 17B
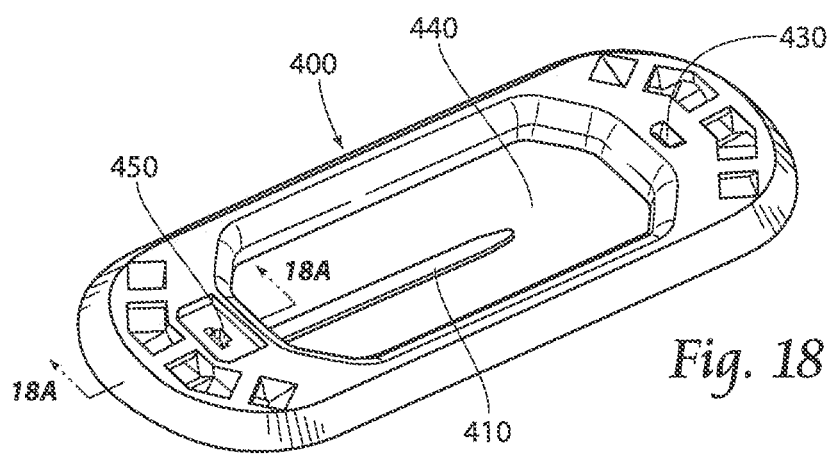
Fig. 18

PROTECTIVE BUNDLE ROUTING GROMMET FOR WIDE RANGE PANEL THICKNESS

CROSS-REFERENCE TO RELATED APPLICATION

This application is a divisional application and claims the benefit under 35 U.S.C. § 120 of co-pending U.S. patent application Ser. No. 15/817,406, filed Nov. 20, 2017 which claims the benefit under 35 USC § 119(e) of U.S. Provisional Patent Application No. 62/431,670 filed on Dec. 8, 2016, the entire disclosure of each of which is hereby incorporated by reference.

TECHNICAL FIELD OF THE INVENTION

The invention generally relates to a grommet, and more particularly relates to a protective bundle routing grommet suitable for use with a wide range of panel thicknesses.

BACKGROUND OF THE INVENTION

It is often necessary to pass a wire, bundle of wires, tube or conduit through an opening in a panel, such as a vehicular frame rail. The panel opening is likely to have sharp edges from the cutting or punching operation that formed the opening. These sharp edges can cut or abrade the object (the wire, bundle of wires, tube or conduit) that is passed through the opening. To prevent this damage, a grommet is often utilized by first inserting the grommet into the opening. The object is next inserted into the opening in the grommet. The grommet protects the object from the sharp opening edges. Prior art grommets typically comprise a one piece construction and are inserted into one side of the opening. These grommets have many drawbacks including the need to match the height of the grommet with the depth or thickness of the opening. Other drawbacks include the lack of a robust retention means to retain the grommet in the opening and to prevent it from being dislodged from the opening. A single-piece grommet may also not provide adequate protection for the object passing there through on the side opposite the side where the grommet is inserted. Depending upon the grommet's construction or fit, this side may not provide adequate protection against abrading.

Two-piece prior art grommets suffer from similar drawbacks. The depth of a two-piece grommet must be matched to the thickness of the panel opening. Clips are commonly used to attach the first grommet piece to the second piece. These clips tend to easily break and thus the grommet halves can easily separate, especially the grommet on the lower surface. When the grommet must be replaced, the retention clips (or other fastening means) are typically broken during removal and thus the grommet assembly must be entirely replaced. Another drawback during replacement is the need to unthread the object (the wire, bundle of wires, tube or conduit) from the opening in the grommet. In the case of a wire, the wire must be cut or in the case of a conduit, the conduit must be uncoupled from the closest fitting. The object must be removed from the grommet opening and then re-threaded into the opening of the new grommet. The present invention includes grommet embodiments whose object openings can be opened or separated to allow the object to be removed from the old grommet opening and installed in the new grommet opening without the need to cut or disconnect the object.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to one embodiment of the invention, a grommet assembly configured to be disposed within an aperture in a panel having a first surface and a second surface opposite the first surface is provided. The grommet assembly includes a grommet frame configured to contact the first surface of the panel and an elastomeric region extending from the grommet frame and configured to be inserted within the aperture. The elastomeric region defines a plurality of ribs angled such that the ribs are configured to provide an insertion force when the elastomeric region is inserted within the aperture and provide a removal force greater than the insertion force when the elastomeric region is withdrawn from the aperture.

In an example embodiment having one or more features of the grommet assembly of the previous paragraph, the grommet frame and the elastomeric region are characterized as having an oval shape.

In an example embodiment having one or more features of the grommet assembly of the previous paragraph, the grommet frame includes a first routing trough configured to be arranged within the aperture and to receive a first elongate object. The first routing trough is angled at an acute angle relative to the first surface of the panel.

In an example embodiment having one or more features of the grommet assembly of the previous paragraph, the first routing trough defines a generally semicircular cross section.

In an example embodiment having one or more features of the grommet assembly of the previous paragraph, the grommet frame includes a second routing trough configured to be arranged within the aperture and to receive a second elongate object. The second routing trough is angled at an acute angle relative to the first surface of the panel. The second routing trough is arranged opposite the first routing trough.

In an example embodiment having one or more features of the grommet assembly of the previous paragraph, the second routing trough defines a generally semicircular cross section.

In an example embodiment having one or more features of the grommet assembly of the previous paragraph, the first routing trough is configures to contact a bottom surface of the first elongate object and the second routing trough is configured to contact a top surface of the second elongate object.

In an example embodiment having one or more features of the grommet assembly of the previous paragraph, a first radius of the first routing trough is different than a second radius of the second routing trough.

In an example embodiment having one or more features of the grommet assembly of the previous paragraph, the first radius is substantially equal to a radius of the first elongate object and wherein the second radius is substantially equal to a radius of the second elongate object.

In an example embodiment having one or more features of the grommet assembly of the previous paragraph, the grommet assembly further includes a first cable tie encircling the first elongate object adjacent a first retaining tab defined on a free end of the first routing trough and a second cable tie encircling the second elongate object adjacent a second retaining tab defined on a free end of the second routing trough.

According to one embodiment of the invention, a method of manufacturing a grommet assembly configured to be disposed within an aperture in a panel having a first surface and a second surface opposite the first surface is provided. The method includes the steps of providing a grommet frame configured to contact the first surface of the panel and molding an elastomeric region around and extending from the grommet frame using a two shot molding process. The elastomeric region is configured to be inserted within the aperture. The elastomeric region defines a plurality of ribs angled such that the ribs are configured to provide an insertion force when the elastomeric region is inserted within the aperture and provide a removal force greater than the insertion force when the elastomeric region is withdrawn from the aperture.

In an example embodiment having one or more features of the method of the previous paragraph, the grommet frame and the elastomeric region are characterized as having an oval shape.

In an example embodiment having one or more features of the method of the previous paragraph, the grommet frame includes a first routing trough configured to be arranged within the aperture and to receive a first elongate object. The first routing trough is angled at an acute angle relative to the first surface of the panel.

In an example embodiment having one or more features of the method of the previous paragraph, the first routing trough defines a generally semicircular cross section.

In an example embodiment having one or more features of the method of the previous paragraph, the grommet frame includes a second routing trough configured to be arranged within the aperture and to receive a second elongate object. The second routing trough is angled at an acute angle relative to the first surface of the panel. The second routing trough is arranged opposite the first routing trough.

In an example embodiment having one or more features of the method of the previous paragraph, the second routing trough defines a generally semicircular cross section.

In an example embodiment having one or more features of the method of the previous paragraph, the first routing trough is configures to contact a bottom surface of the first elongate object and the second routing trough is configured to contact a top surface of the second elongate object.

In an example embodiment having one or more features of the method of the previous paragraph, a first radius of the first routing trough is different than a second radius of the second routing trough.

In an example embodiment having one or more features of the method of the previous paragraph, the first radius is substantially equal to a radius of the first elongate object and wherein the second radius is substantially equal to a radius of the second elongate object.

In an example embodiment having one or more features of the method of the previous paragraph, the grommet assembly further includes a first cable tie encircling the first elongate object adjacent a first retaining tab defined on a free end of the first routing trough and a second cable tie encircling the second elongate object adjacent a second retaining tab defined on a free end of the second routing trough.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIGS. 9 through 14 depict the installation of the grommet assembly about an opening;

FIG. 17 is a top perspective view of another alternate embodiment of the grommet;

FIG. 17A is a sectional view taken through line 17A-17A in FIG. 17;

FIG. 17B is a sectional view similar to FIG. 17A, but showing the grommet assembly secured in place about a panel opening;

FIG. 18 is a top perspective view of another alternate embodiment of the grommet;

FIG. 25 is a side elevation view of the alternate grommet in a panel opening with objects passing there through; and FIG. 26 is a sectional side view of the alternate grommet in a panel opening with objects passing there through.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
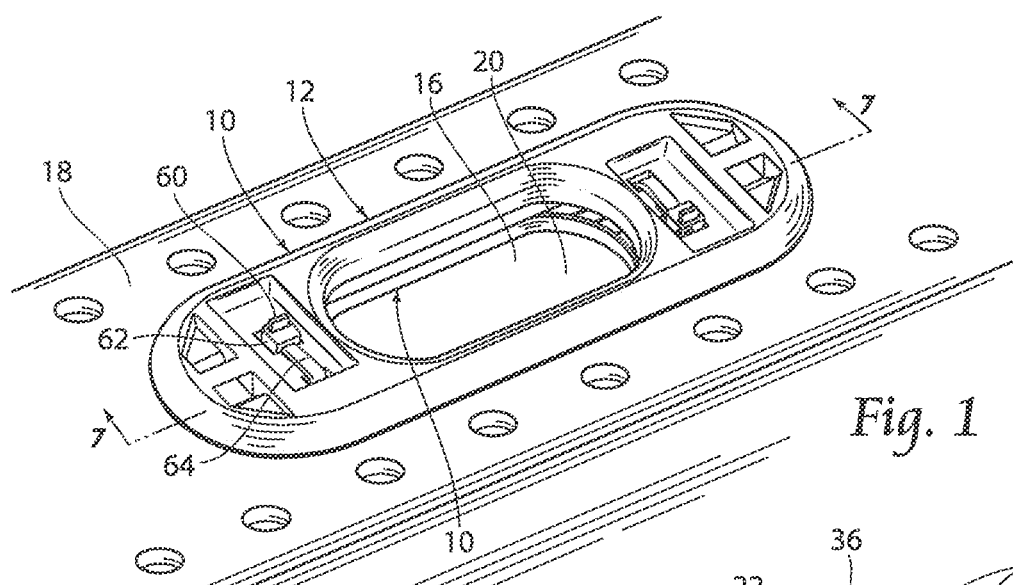
FIG. 1 is a perspective view of the two piece grommet assembly installed on a panel.

As shown in FIG. 1, the grommet assembly 12 of the present invention includes two grommet pieces 10. While grommet pieces 10 are identical in the preferred embodiment of the invention 12, it is to be understood that each grommet piece 10 could be different in construction or features from the other and still fall within the scope of the present invention. Each of the grommet pieces 10 is placed on opposite sides of an opening 16 in a panel 18, such as the frame rail shown in FIG. 1. Thus the panel 18 is substantially "sandwiched" between the grommet pieces 10, as shown. Grommet assembly cable ties 60 are passed through openings, typically in the form of small slots, in each grommet piece 10 to secure each grommet piece 10 to the other piece and to retain the grommet assembly 12 in the opening 16.

Now referring to FIGS. 2 through 5, each grommet piece 10 includes a pass through slot 20, an internal radius 22, a perimeter radius 24, a slot-shaped pilot ridge 26, multiple recessed grommet cable tie slots 28, cable tie recesses 30, recessed mounting saddles 32, and a perimeter wedge profile 34.

The pass through slot 20 is the path for elongate objects 14, such as wire bundles, tubes, or hoses to be routed through the opening 16 from one side of the panel 18 to the other side. Each grommet piece 10 extends into the opening 16 and covers the sharp edges of the panel opening to isolate and protect the objects 14 from abrading against the cut edges of the opening 16 as they pass there through.

The edge of internal radius 22 along the inside of the pass through slot 20 provides a smooth contact surface for objects 14 that are routed and passed through the slot 20. The slot 20 along with internal radius 22 does not have any sharp edges and thus prevents any abrading or unwanted wear on the objects 14 passing therethrough.

The perimeter radius 24 on the outer edge of the grommet piece 10 provides clearance to adjacent features or parts that may be mounted to the frame rail or panel 18. For example, if a second panel is mounted perpendicularly to the panel 18 having opening 16, the grommet piece 10 may be positioned immediately adjacent the second perpendicular panel. The perimeter radius 24 also provides a smooth, snag free transition from the surface of the panel 18 to the top surface 36 of the grommet piece 10 for routing objects 14, such as harnesses, hoses, cables, etc., adjacent or across the grommet piece 10.

The pilot ridge 26 extending below the bottom surface 38 of the grommet piece 10 serves as an alignment and retention feature when installing the grommet piece 10 in its application slot or opening 16. In a preferred embodiment, the pilot ridge 26 has substantially the same shape as the slot or opening 16. It also further guards the objects 14 from contacting the cut edge of the opening 16.

Figure 2:
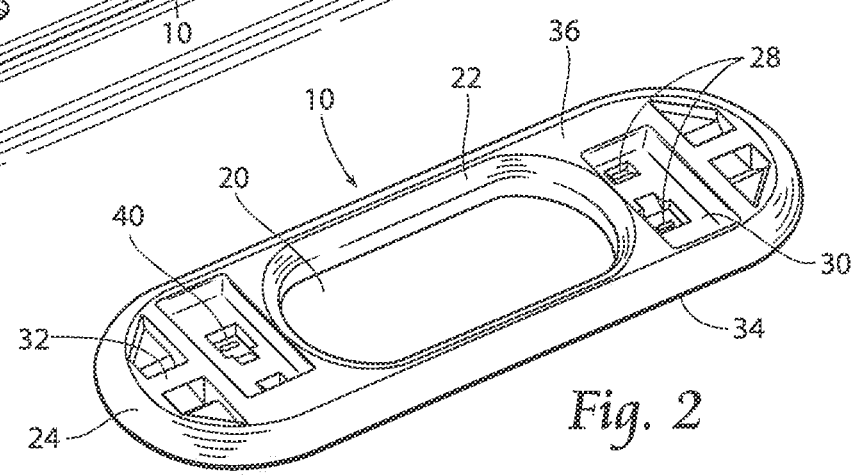
FIG. 2 is a top perspective view of a grommet.
Figure 3:
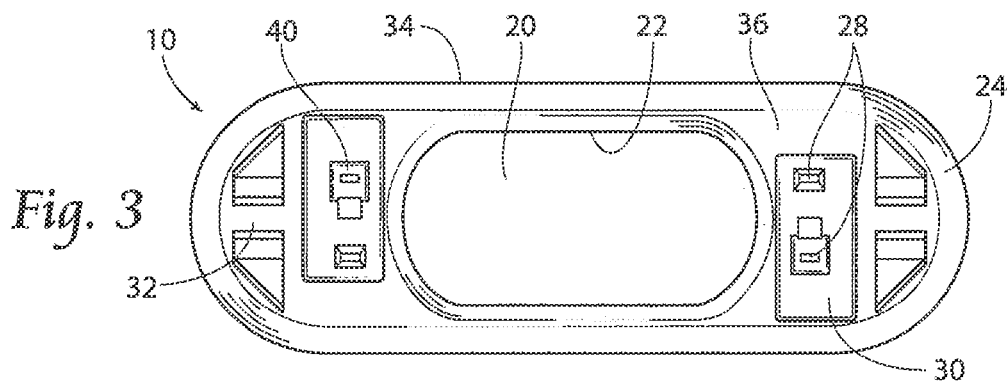
FIG. 3 is a top plan view of the grommet.
Figure 4:
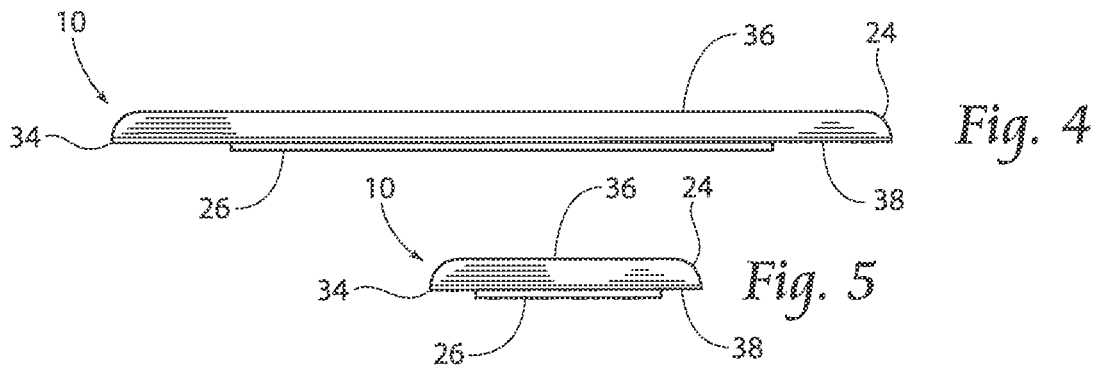
FIG. 4 is left side elevation view of the grommet, the right side being identical thereto.
Figure 5:
FIG. 5 is a front elevation view of the grommet, the rear view being identical thereto.
Figure 6:
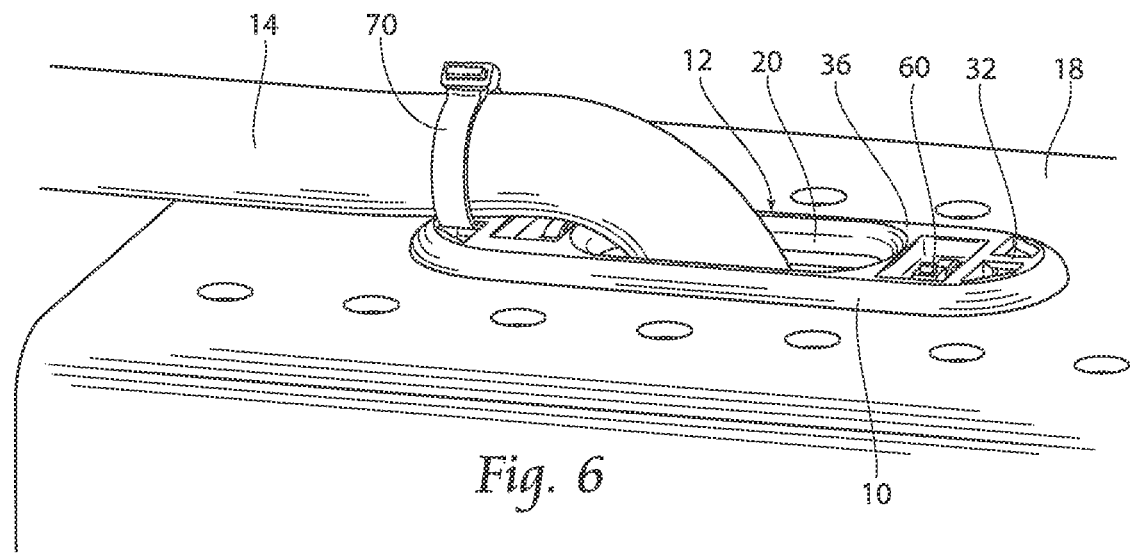
FIG. 6 is a top perspective view of the grommet assembly with an object secured to the grommet and passing through an opening the panel.

As best shown in FIGS. 1 through 3, a nesting pocket 40 for a cable tie head 62 and two cable tie pass through cable tie slots 28 are formed on each end of the grommet piece 10 and align the cable tie head 62 of the grommet assembly cable ties 60 with the incoming cable tie tail 66. The nesting pockets 40 are large recesses allowing the remaining portion of the cable tie strap 64 after cut-off and the cable tie head 62 to sit below the top surface 36 of the grommet to avoid abrading any objects 14 passing over the grommet piece 10.

As described hereafter (and as seen in FIG. 11), the large cable tie recess 30 around the cable tie slots 28 allows cable tie tensioning and cutoff tools to be used on the grommet assembly cable ties 60 such that the cable tie strap 64 remains below the top surface 36 of the grommet piece 10. Embossed indicia (not shown) may be formed or applied in the cable tie recesses 30 to demonstrate how to assemble the grommet pieces 10 to each other with the grommet assembly cable ties 60.

As best shown in FIGS. 1 through 3 and 6, one or more recessed mounting saddles 32 located on the outboard sides of the pass through slot 20 provide a location for looping object retaining cable ties 70 to secure the object 14 to the selected grommet 10. The saddle mounts 32 are flush with the top surface 36 of the grommet which keeps the objects 14 from being abraded.

Figure 8:
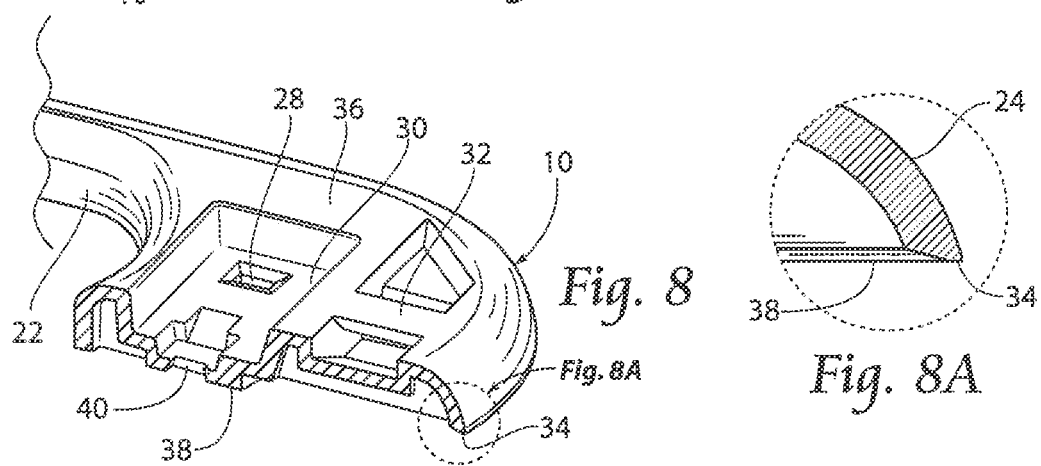
FIG. 8 is a cut-away view of a portion of the grommet taken from FIG. 7.
Figure 8A:
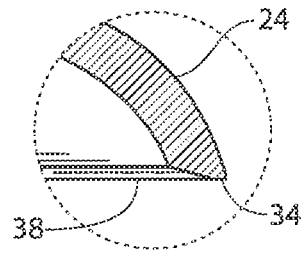
FIG. 8A is an enlarged view of a portion of the grommet taken from FIG. 8.

Now referring to FIG. 8A, a perimeter wedge profile 34 around the perimeter of bottom surface 38 of the grommet piece 10 allows the grommet piece 10 to conform to the surface of the panel 18 when being assembled and compressed by tensioning the grommet assembly cable ties 60. The perimeter wedge profile 34 provides anti-rattling of the installed grommet assembly 12 which will minimize vibration noise if installed in the firewall of a vehicle cab for example.

Figure 7:
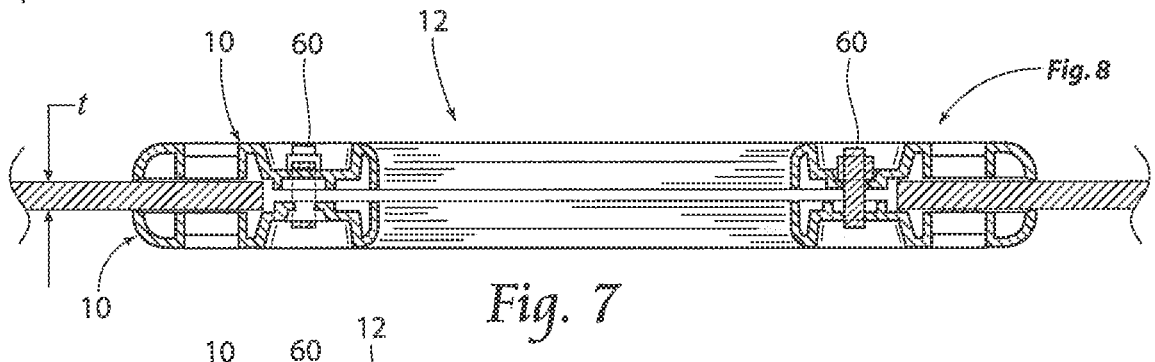
FIG. 7 is a sectional view of the grommet assembly taken through line 1-1 in FIG. 1.
Figure 7A:
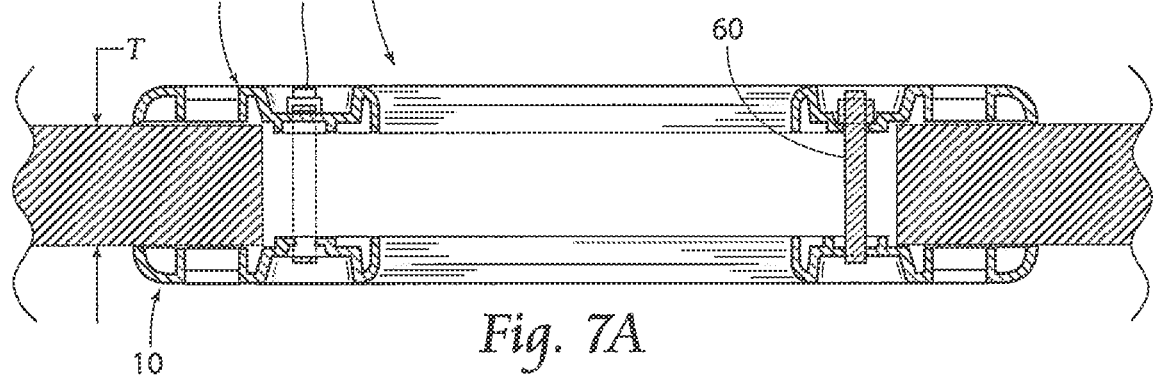
FIG. 7A is another sectional view of the grommet assembly taken through a thicker panel.

FIGS. 7 and 7A depict another important feature of the invention 10. The same grommet pieces 10 can be used on panels of varying thickness T. Thus it is not necessary to stock or supply different grommet pieces 10 depending upon the thickness of the panel 18. FIG. 7 shows the grommet pieces 10 applied to a panel having a relatively thin thickness t while FIG. 7A shows the same grommet pieces 10 being applied to a panel having a greater thickness T. Despite the difference in panel thickness (t and T), the grommet pieces 10 and grommet assembly cable ties 60 can be identical in each application.

Figure 12:
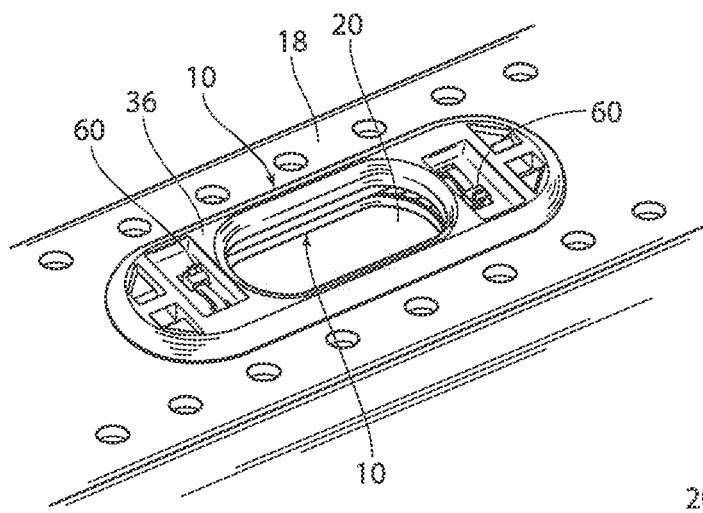
Figure 13:
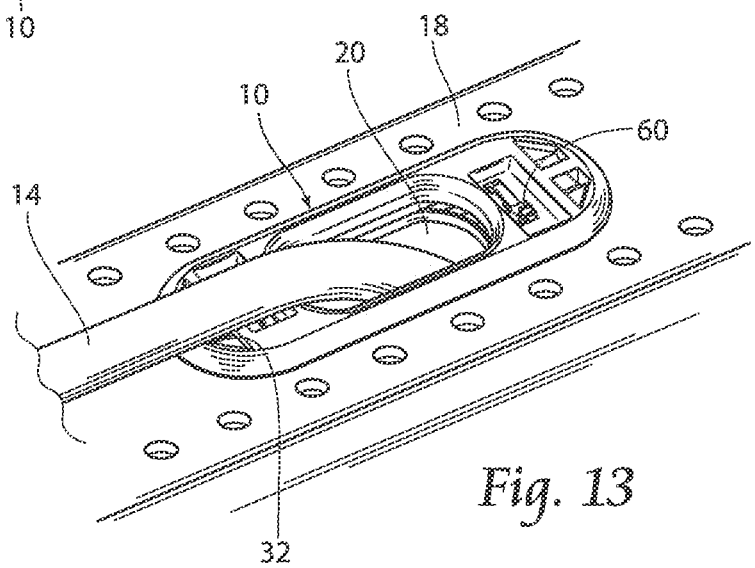

The grommet assembly 12 assembly process is shown in FIGS. 9 through 14. As seen in FIG. 9, grommet pieces 10 are placed above and below the panel 18. The pass through slot 20 of each grommet piece 10 is aligned with the opening 16 in the panel 18. As shown in FIG. 10, grommet assembly cable ties 60 are inserted through both grommet pieces 10 in their respective cable tie slots 28 and each cable tie tail 66 is passed through the opening in its respective cable tie head 62. The grommet assembly cable ties 60 are next tensioned with a cable tie tensioning and cutoff tool or other tool 80 as depicted in FIG. 11. A fully installed grommet assembly is shown in FIG. 12. It should be noted that the cut cable tie straps are located below the top surface 36 of the top or uppermost grommet piece 10. Now turning to FIG. 13, an object 14 is threaded through the pass through slot 20 in each grommet piece 10.

Figure 14:
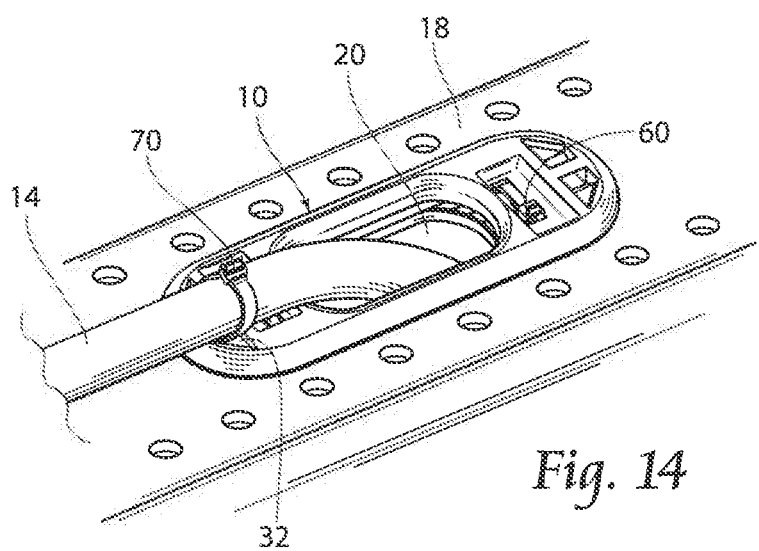

Finally and as shown in FIG. 14, the object 14 is secured to a recessed mounting saddle 32 with a cable tie 70.

Figure 15:
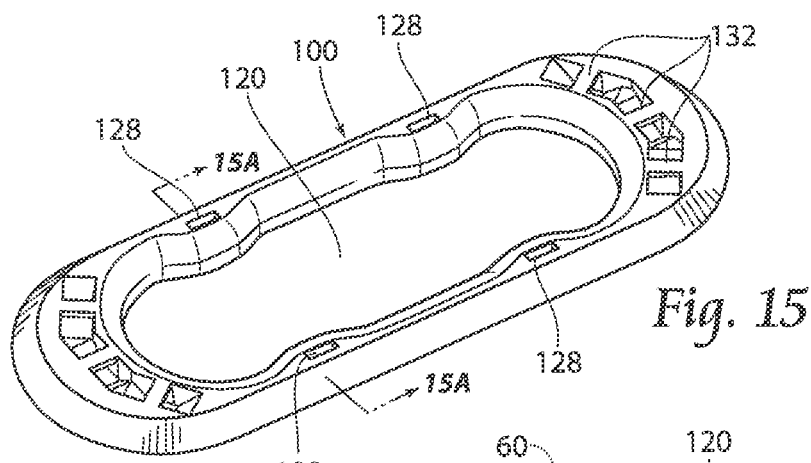
FIG. 15 is a top perspective view of an alternate embodiment of the grommet.
Figure 15A:
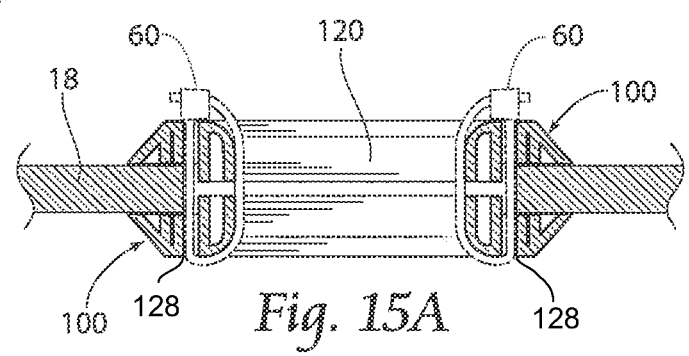
FIG. 15A is a sectional view taken through line 15A-15A in FIG. 15.

Alternate embodiments of the two-piece grommet assembly 112 are shown in FIGS. 15 through 19. Grommet piece 100 shown in FIGS. 15 and 15A has multiple recessed mounting saddles 132 for cable ties (not shown) on each end of the grommet piece 100 in a radial configuration. It should be noted that more or fewer recessed mounting saddles 132 may be utilized on one or both ends of the grommet piece 100 without departing from the invention. In addition, cable tie slots 128 have been re-positioned to the perimeter of the pass through slot 120 thus allowing the size of the pass through slot 120 to be enlarged. This in turn allows for the threading of larger objects 14 or a greater number of objects 14 through the slot 120. The configuration of grommet assembly cable ties 60 installed relative to the grommet pieces 100 and passing through slot 120 is shown in the sectional view of FIG. 15A.

Figure 16:
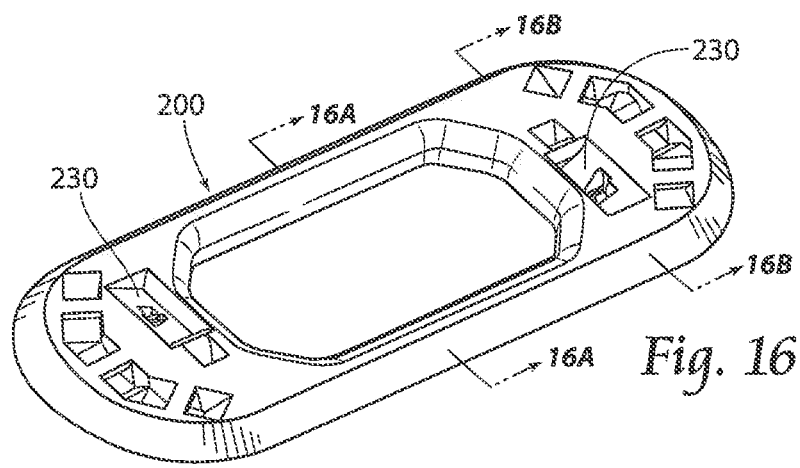
FIG. 16 is a top perspective view of another alternate embodiment of the grommet.
Figure 16A:
FIG. 16A is a sectional view taken through line 16A-16A in FIG. 16.
Figure 16B:
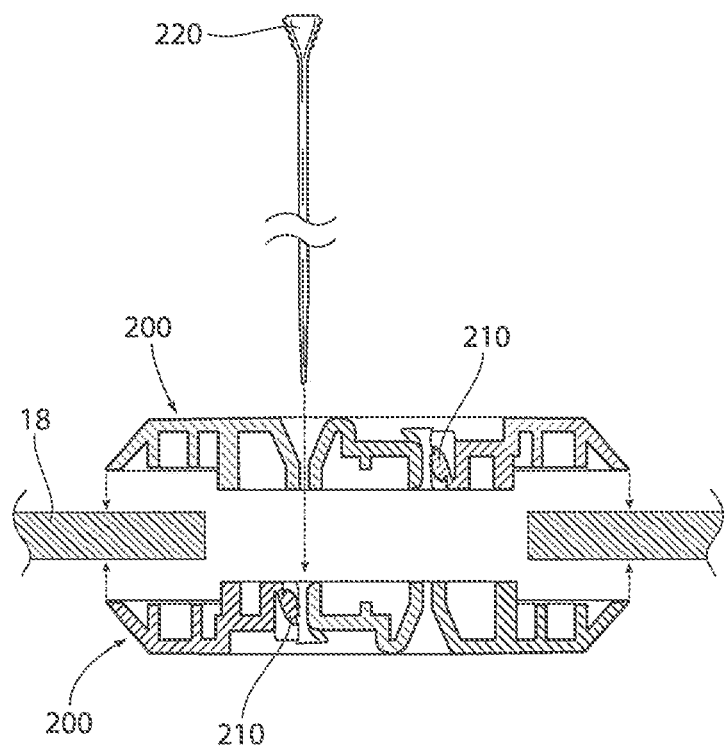
FIG. 16B is a sectional view taken through line 16B-16B in FIG. 16 showing a grommet assembly cable tie prior to insertion into the first grommet.
Figure 16C:
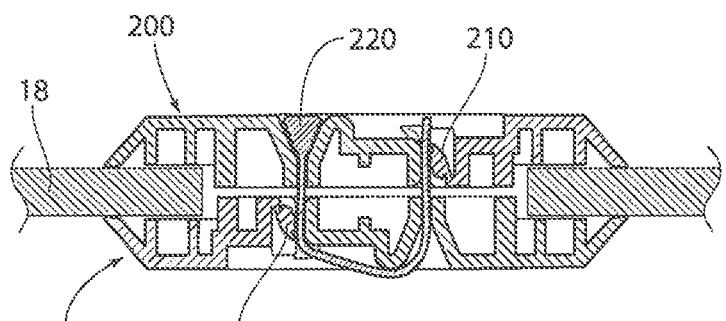
FIG. 16C is a section view similar to FIG. 16B showing the grommet assembly cable tie inserted through both pieces of the grommet assembly.
Figure 16D:
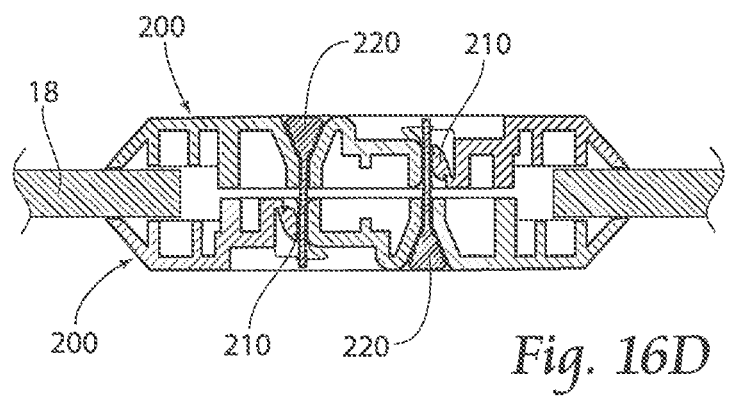
FIG. 16D is a section view similar to FIG. 16B showing two grommet assembly cable ties inserted through both pieces of the grommet assembly.

FIGS. 16 through 16D depict an embodiment of the grommet piece 200 that has integral pawls 210 for use with grommet assembly ties 220 having a wedge-shaped head, as shown best in FIGS. 16B and 16D. As shown in FIG. 16, angled recesses 230 allow side cutting plyers (not shown) to be used to trim straps of grommet assembly ties 220. FIG. 16A depicts the pair of grommet pieces 200 positioned between and sandwiching the panel 18. As best shown in FIGS. 16B through 16C, the integral pawl configuration of embodiment 200 uses two integral pawls 210 per grommet piece 200. FIGS. 16B and 16C show the use of a single wedge-shaped head grommet assembly tie 220 being utilized to retain the grommet pieces 200 to the panel 18. The grommet assembly tie 220 is first threaded through aligned openings in the first and second grommet pieces 200 and then threaded back through a second set of aligned openings in the first and second grommet pieces 200. FIG. 16D shows a variation whereby a first grommet assembly tie 220 is passed through the first set of aligned openings and a second grommet assembly tie 220 is passed through the second set of aligned openings. In either case, the tie can be tightened by hand and the excess tie strap and tie tail can be cut with a hand tool. Alternatively, the grommet assembly ties 220 can both be tightened and cut with a cable tie tensioning and cutoff tool to the approximate lengths shown in FIGS. 16C and 16D.

Another alternative embodiment 300 is shown in FIGS. 17 through 17B. In this embodiment, each grommet piece 300 has integrally molded cable tie straps 310 and integrally formed pawls 320 located within cable tie openings 330. The cable tie straps 310 are molded to the interior of the grommet piece 300 and then folded down to attach to the opposite grommet piece 300, as seen in FIG. 17B. Each cable tie strap 310 is passed through an aligned cable tie opening 330 in the opposite grommet piece 300. The excess portions of the cable tie strap and tail are trimmed and discarded as described above. This embodiment 300 also allows more routing space within the grommet pass through slot 340.

Figure 18A:
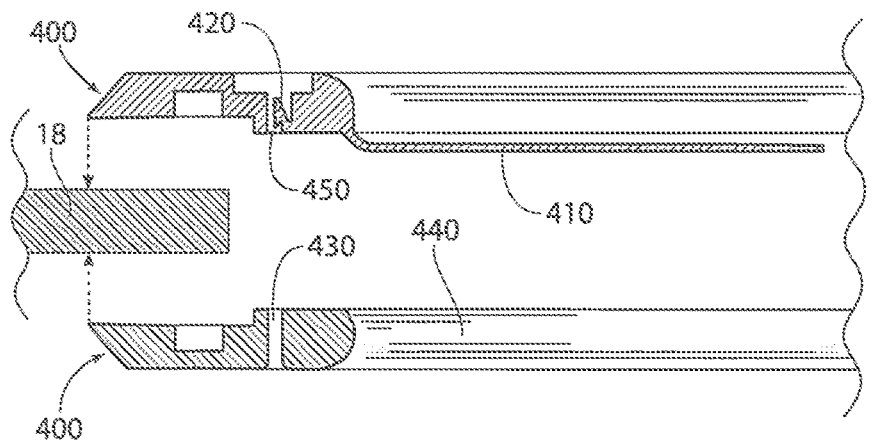
FIG. 18A is a sectional view taken through line 18A-18A in FIG. 18.
Figure 18B:
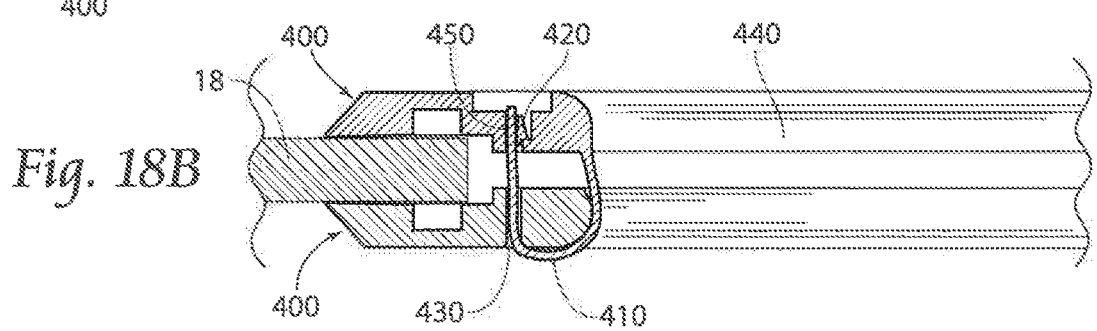
FIG. 18B is a sectional view similar to FIG. 18A, but showing the grommet assembly secured in place about a panel opening.

Another alternative embodiment 400 is shown in FIGS. 18 through 18B. In this embodiment, each grommet piece 400 has one molded in or integrally formed cable tie strap 410 and an integral pawl 420 located in a cable tie opening 450. The cable tie straps 410 is molded to the interior of the grommet piece 400 and then again folded down to pass through the pass through slot 440 in the opposite grommet piece 400 as seen in FIG. 18B. The cable tie strap 410 is next passed through a cable tie opening 430 in the opposite grommet piece 400 and finally through cable tie opening 450 in the grommet piece 400 to which the cable tie strap 410 is formed. The integral pawl 420 retains the cable tie strap 410 within cable tie opening 450. This embodiment 400 also allows more routing space within the grommet pass through slot 440.

Figure 19:
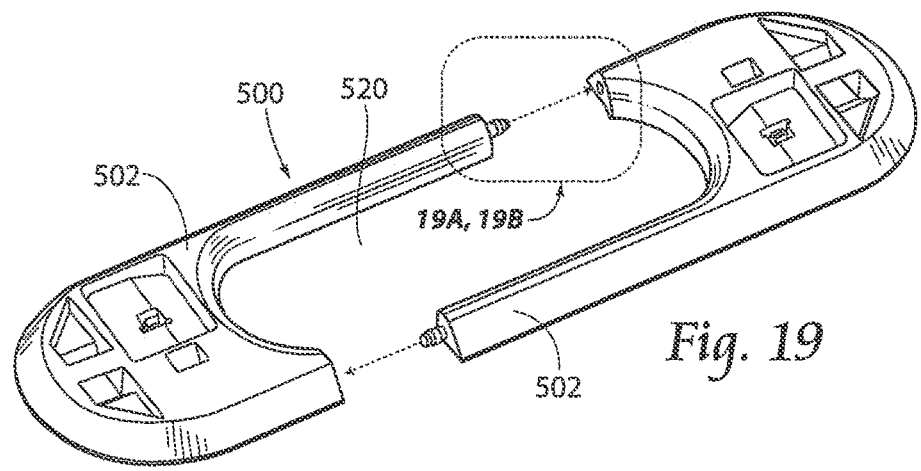
FIG. 19 is a top perspective view of another alternate embodiment of the grommet.
Figure 19A:
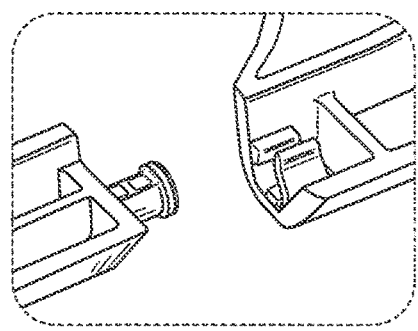
FIG. 19A is an exploded perspective view of a first connection means utilized in the embodiment of FIG. 19.
Figure 19B:
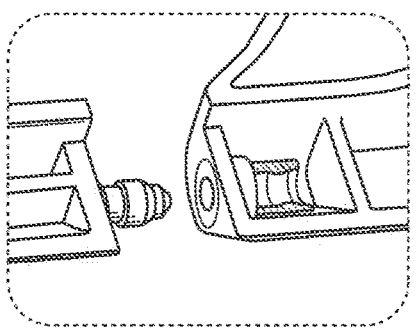
FIG. 19B is an exploded perspective view of a second connection means utilized in the embodiment of FIG. 19.
Figure 20:
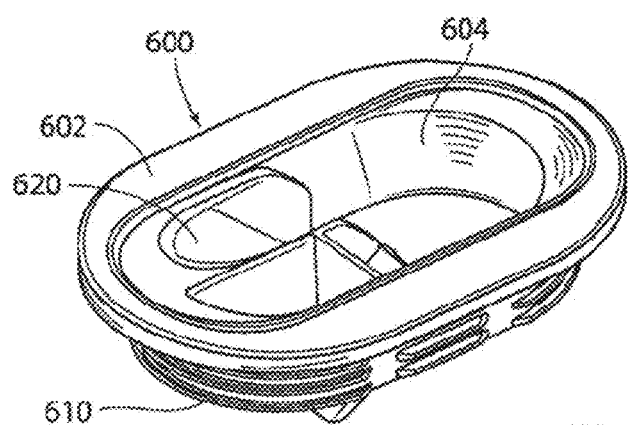
FIG. 20 is a top perspective view of an alternate one-piece grommet.
Figure 21:
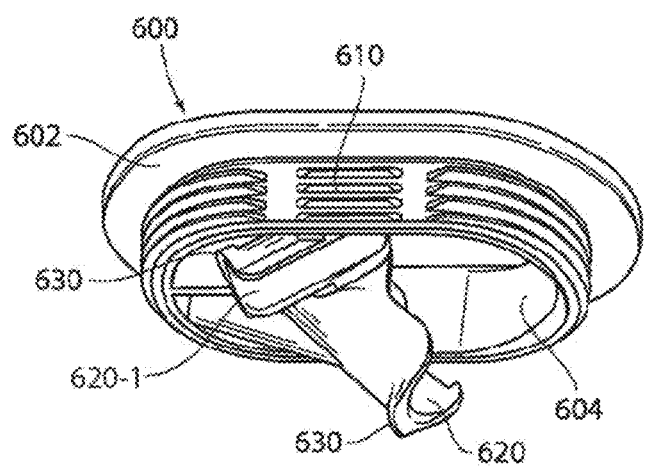
FIG. 21 is a bottom perspective view of the alternate one-piece grommet.
Figure 22:
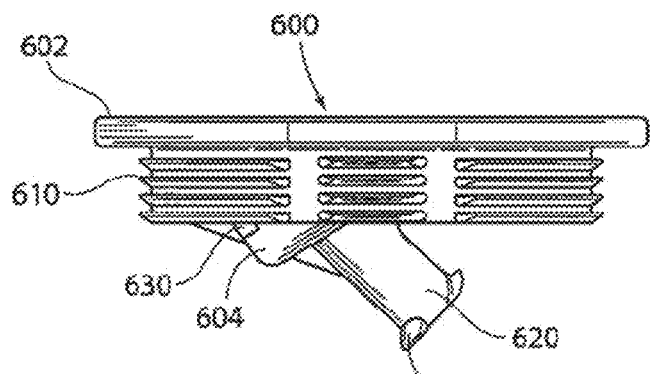
FIG. 22 is a left side elevation view of the alternate one-piece grommet, the right side elevation view being a mirror image thereof.
Figure 23:
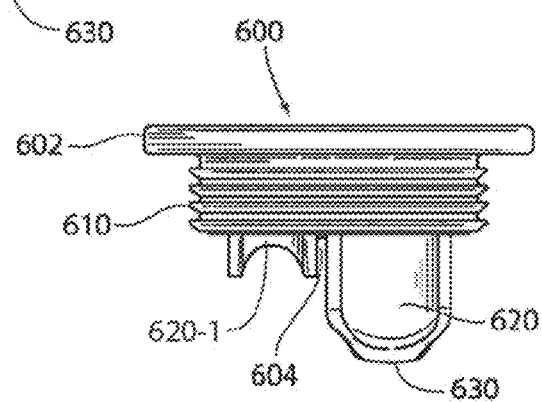
FIG. 23 is a front elevation view of the alternate one-piece grommet, the rear elevation view being a mirror image thereof.
Figure 24:
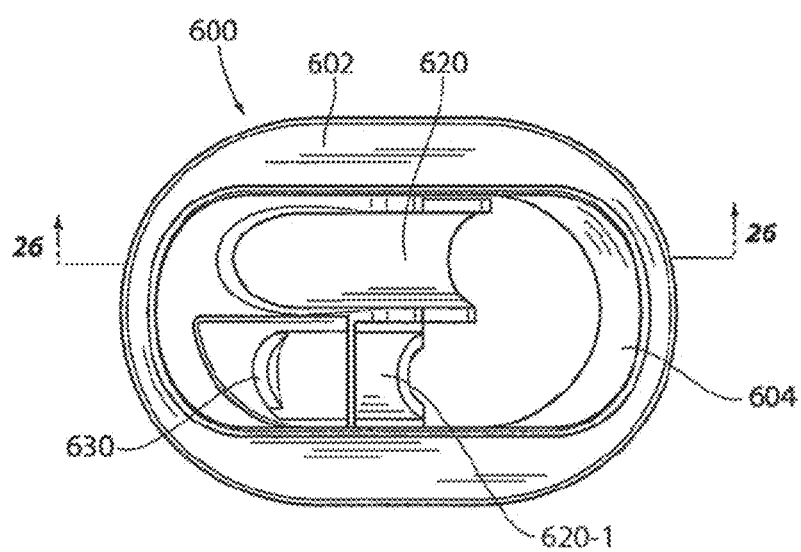
FIG. 24 is a top plan view of the alternate one-piece grommet.

FIGS. 19 through 19B show yet another embodiment wherein the grommet piece 500 can be split apart and then snapped back together. Each of the two grommet pieces 502 may be identical and snap together. Alternately, each of the two grommet pieces may not be identical. The splittable feature allows the grommet piece 500 to be removed and replaced without re-routing the objects 14. In one embodiment shown in FIG. 19A, a snap fit connection is utilized. In the embodiment of FIG. 19B, a press fit connection is shown. After the press fit connection is pressed together, the grommet halves 502 can be rotated into position and snapped together. The press fit connection is much more robust than the snap fit connection and can be pre-assembled before packaging for quick and easy assembly of the snap fit connection by the end user. This embodiment allows the grommet piece 500 to be split, removed and replaced without unthreading and re-threading the bundle or object (not shown) through the pass through slot 520.

Figure 25:
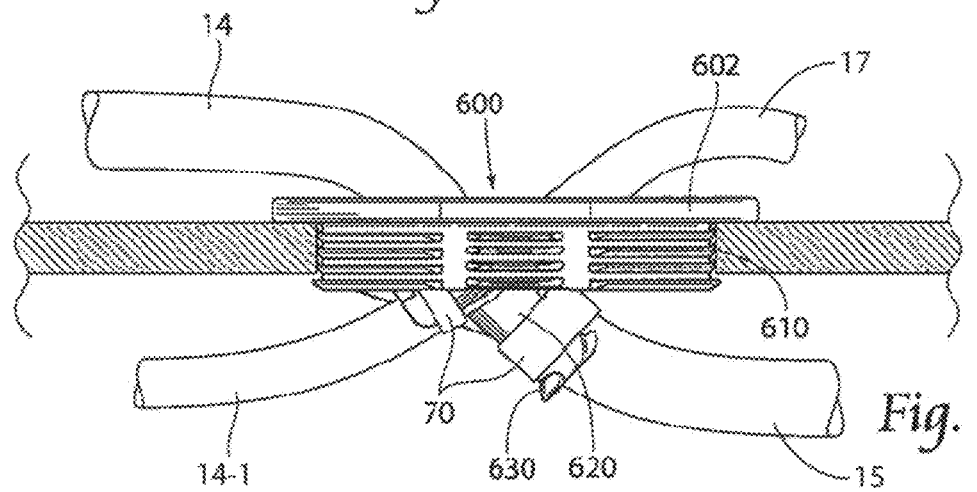
Figure 26:
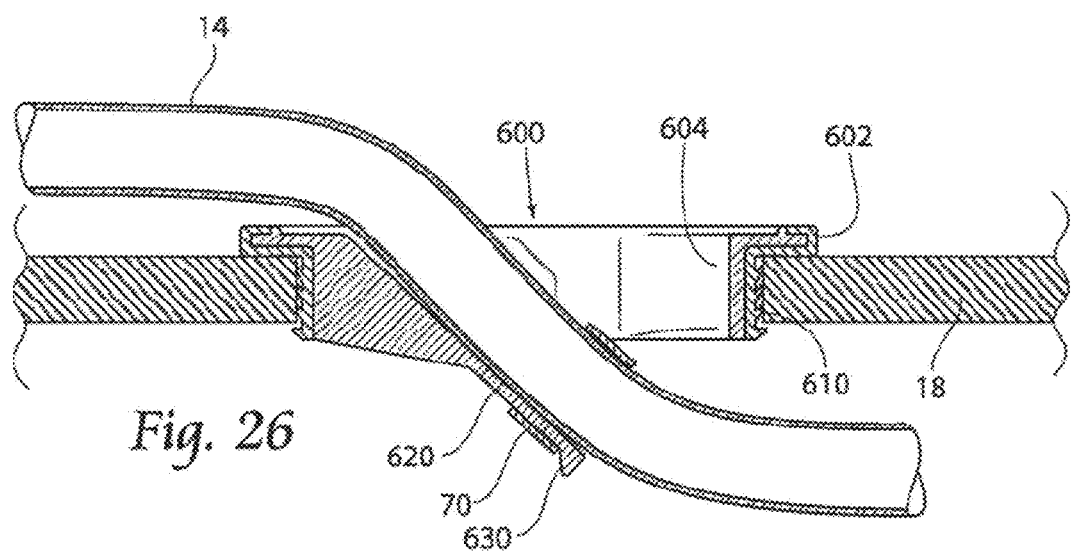

A single sided grommet 600 is shown in FIGS. 20 through 26. The single sided grommet 600 incorporates multi-shot molding of an elastomeric region 602 around the outside of the grommet frame 604. This elastomeric region 602 contains rib or fin profiles 610 that are angled to provide low insertion force of the single sided grommet 600 into the opening 16 in contrast to the high extraction force required to remove the single sided grommet 600 from the panel 18. As best shown in FIGS. 25 and 26, grommet embodiment 600 is designed to simultaneously route objects 14, 14-1 in opposite directions through the single sided grommet 600. Objects 14, 14-1 are secured to the routing troughs 620, 620-1 in the single sided grommet 600 by wrapping a cable tie 70 around the routing trough 620, 620-1 and object 14, 14-1 adjacent to the retention tabs 630. The curvature of the routing troughs 620, 620-1 match the outer diameter of the object 14, 14-1 and provide reinforcement of objects 14, 14-1 for tensioning the securing cable ties 70. This minimizes the crimping 25 of soft objects 14, 14-1. The grommet 600 may include a first routing trough 620 that is configured to contact a bottom surface 15 of the first elongate object 14 and the second routing trough 620-1 that is configured to contact a top surface 17 of the second elongate object 14-1.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

In the following claims, the terms "including" and "in which" are used as the plain-English equivalents of the respective terms "comprising" and "wherein." Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

Further, the limitations of the following claims are not written in means-plus-function format and are not intended to be interpreted based on 35 USC § 112(f), unless and until such claim limitations expressly use the phrase "means for" followed by a statement of function void of further structure.

I claim:

1. A grommet assembly configured to be disposed within an aperture in a panel having a first surface and a second surface opposite the first surface, the grommet assembly comprising:
   a grommet frame configured to contact the first surface of the panel, the grommet frame comprising:
      a first routing trough configured to be arranged within the aperture and configured to receive a first elongate object, the first routing trough angled at an acute angle relative to the first surface of the panel; and
      a second routing trough configured to be arranged within the aperture and configured to receive a second elongate object, the second routing trough angled at an acute angle relative to the first surface of the panel, the second routing trough arranged opposite the first routing trough; and
   an elastomeric region extending from the grommet frame and configured to be inserted within the aperture, wherein the elastomeric region defines a plurality of ribs angled such that the plurality of ribs are configured to provide an insertion force when the elastomeric region is inserted within the aperture and provide a removal force greater than the insertion force when the elastomeric region is withdrawn from the aperture.

2. The grommet assembly according to claim 1, wherein the grommet frame and the elastomeric region are characterized as having an oval shape.

3. The grommet assembly according to claim 1, wherein the first routing trough defines a generally semicircular cross section.

4. The grommet assembly according to claim 1, wherein the second routing trough defines a generally semicircular cross section.

5. The grommet assembly according to claim 1, wherein the first routing trough is configured to contact a bottom surface of the first elongate object and the second routing trough is configured to contact a top surface of the second elongate object.

6. The grommet assembly according to claim 1, wherein a first radius of the first routing trough is different than a second radius of the second routing trough.

7. The grommet assembly according to claim 6, wherein the first radius is substantially equal to a radius of the first elongate object and wherein the second radius is substantially equal to a radius of the second elongate object.

8. The grommet assembly according to claim 1, wherein the grommet assembly further includes a first cable tie encircling the first elongate object adjacent a first retaining tab defined on a free end of the first routing trough and a second cable tie encircling the second elongate object adjacent a second retaining tab defined on a free end of the second routing trough.

9. The grommet assembly according to claim 1, wherein the first routing trough is configured to contact a bottom surface of the first elongate object and the second routing trough is configured to contact a top surface of the second elongate object, and wherein a first radius of the first routing trough is different than a second radius of the second routing trough.

10. The grommet assembly according to claim 9, wherein the first radius is substantially equal to a radius of the first elongate object and wherein the second radius is substantially equal to a radius of the second elongate object.

11. The grommet assembly according to claim 1,
   wherein the first routing trough is configured to contact a bottom surface of the first elongate object and the second routing trough is configured to contact a top surface of the second elongate object; and
   wherein the grommet assembly further includes a first cable tie encircling the first elongate object adjacent a first retaining tab defined on a free end of the first routing trough and a second cable tie encircling the second elongate object adjacent a second retaining tab defined on a free end of the second routing trough.

12. The grommet assembly according to claim 1,
   wherein the first routing trough is configured to contact a bottom surface of the first elongate object and the second routing trough is configured to contact a top surface of the second elongate object;
   wherein a first radius of the first routing trough is different than a second radius of the second routing trough;
   wherein the first radius is substantially equal to a radius of the first elongate object and wherein the second radius is substantially equal to a radius of the second elongate object; and
   wherein the grommet assembly further includes a first cable tie encircling the first elongate object adjacent a first retaining tab defined on a free end of the first routing trough and a second cable tie encircling the second elongate object adjacent a second retaining tab defined on a free end of the second routing trough.

13. A method of manufacturing a grommet assembly configured to be disposed within an aperture in a panel having a first surface and a second surface opposite the first surface, the method comprising the steps of:
   providing a grommet frame configured to contact the first surface of the panel, wherein the grommet frame includes a first routing trough configured to be arranged within the aperture and to receive a first elongate object, wherein the first routing trough is angled at an acute angle relative to the first surface of the panel, wherein the grommet frame includes a second routing trough configured to be arranged within the aperture and to receive a second elongate object, wherein the second routing trough is angled at an acute angle relative to the first surface of the panel, and wherein the second routing trough is arranged opposite the first routing trough; and molding an elastomeric region around and extending from the grommet frame using a two shot molding process, wherein the elastomeric region is configured to be inserted within the aperture, wherein the elastomeric region defines a plurality of ribs angled such that the plurality of ribs are configured to provide an insertion force when the elastomeric region is inserted within the aperture and provide a removal force greater than the insertion force when the elastomeric region is withdrawn from the aperture.

14. The method according to claim 13, wherein the grommet frame and the elastomeric region are characterized as having an oval shape.

15. The method according to claim 13, wherein the first routing trough defines a generally semicircular cross section.

16. The method according to claim 13, wherein the second routing trough defines a generally semicircular cross section.

17. The method according to claim 13, wherein the first routing trough is configured to contact a bottom surface of the first elongate object and the second routing trough is configured to contact a top surface of the second elongate object.

18. The method according to claim 13, wherein a first radius of the first routing trough is different than a second radius of the second routing trough.

19. The method according to claim 18, wherein the first radius is substantially equal to a radius of the first elongate object and wherein the second radius is substantially equal to a radius of the second elongate object.

20. The method according to claim 13, wherein the grommet assembly further includes a first cable tie encircling the first elongate object adjacent a first retaining tab defined on a free end of the first routing trough and a second cable tie encircling the second elongate object adjacent a second retaining tab defined on a free end of the second routing trough.

* * * * *